UNITED STATES PATENT OFFICE.

BERNARD R. BARVA AND FERDINAND T. WICHMAN, OF FORT WAYNE, INDIANA.

PROCESS OF MANUFACTURING RUBBER BALLS.

1,265,419.  Specification of Letters Patent.  Patented May 7, 1918.

No Drawing.  Application filed January 22, 1917.  Serial No. 143,601.

*To all whom it may concern:*

Be it known that we, BERNARD R. BARVA, and FERDINAND T. WICHMAN, citizens of the United States, residing at Fort Wayne, in the county of Allen and State of Indiana, have invented new and useful Improvements in Processes of Manufacturing Rubber Balls, of which the following is a specification.

The invention relates to processes of manufacturing rubber balls. Solid rubber balls heretofore on the market are hard and heavy and break or chip off with use, and they also deteriorate with age. The object of the invention is to produce a cheap, durable, solid rubber ball which shall be soft, elastic and resilient and have great tensile strength, and which shall retain its softness with age.

We produce a ball having the aforementioned qualities and advantages in the following manner.

We first grind, very finely, a quantity of rubber and fabric in the proportion of 30 to 40 per cent. rubber and 60 to 70 per cent. fabric and then thoroughly mix with the ground material a substantially equal quantity by weight of pure rubber cement. The mixture is then dried for the period of twenty-four hours. The dried mixture is then compressed under a heavy pressure into a suitable mold to fill the mold, and finally the mold is heated for one hour in a temperature of approximately 270 degrees Fahrenheit to cook the compressed mixture.

From an economical standpoint we prefer to grind up old tires which contain about the percentages of rubber and fabric mentioned above and we prefer to cook the compressed mixture in a heater supplied with steam at forty pounds pressure, the temperature of which is approximately 270 degrees.

Coloring matter may be added to the mixture to provide a desired color to the ball.

The proportion of material and the periods of drying and heating may be varied, but we prefer to carry out the process as above described, as the product thereof has the advantages and qualities, described, in high degree.

What we claim is:

1. The process of manufacturing soft-solid rubber balls consisting of mixing rubber cement with an equal quantity by weight of a mixture of finely divided rubber and fabric; then drying the mixture; then compressing the mixture into a mold and then heating the mold and its contents for approximately one hour.

2. The process of manufacturing soft-solid rubber balls consisting of mixing equal quantities by weight of rubber cement and a finely divided mixture containing 30 to 40 per cent. rubber and 60 to 70 per cent. fabric; then drying the mixture for twenty-four hours; then compressing the mixture into a mold and finally heating the mold and its contents for one hour in a temperature of approximately 270 degrees Fahrenheit.

In witness whereof we hereunto subscribe our names this 13th day of January, 1917.

BERNARD R. BARVA.
FERDINAND T. WICHMAN.